Patented Jan. 24, 1939

2,145,119

UNITED STATES PATENT OFFICE 2,145,119

TEMPERING GLASS ARTICLES

Jesse T. Littleton, Corning, N. Y., assignor to Corning Glass Works, Corning, N. Y., a corporation of New York No Drawing. Application April 17, 1935, Serial No. 16,905

4 Claims. (Cl. 49—89)

This invention relates to tempering glass articles and more particularly to heat conditioning the articles preparatory to tempering them.

It is common practice in tempering a glass article to first heat it to a temperature above the annealing point of the glass and while so heated to chill it. There are several factors which control the degree of temper obtainable in a piece of ware, however, one of great importance is directly related to the temperature to which the glass is heated just prior to chilling it. It is the generally accepted theory that the higher the temperature to which the glass is heated just prior to chilling it, the greater will be the degree of temper in the finished ware and, therefore, to obtain the maximum temper in a glass article, it is necessary that the article be heated to a temperature at or near the softening point of the glass from which the article is made. Glass articles when heated by prior art methods to a temperature sufficient to obtain maximum temper become so softened that they warp or sag out of shape with the result that the tempered article is frequently so deformed as to be worthless.

Moreover, when certain glass compositions, such as certain borosilicates and glasses having a high alkali content, are held for any appreciable length of time at temperatures at or near their softening point temperature, they are subject to devitrification. Such devitrification affects the physical and chemical homogeneity of the glass and reduces its resistance to attack by moisture and other reagents thus rendering it useless for many purposes.

Laboratory tests have established that the tensile strength of glass is ordinarily about ten thousand pounds per square inch but these determinations are based on the assumption that the glass is free from surface imperfections such as scratches, scuff, and similar surface defects which are likely to occur in the ordinary handling of the ware. These surface defects have been a great factor in limiting the degree of temper obtainable in a glass article as they so weaken the surface of the glass that when it is subjected to the high tensile forces resulting from suddenly quenching a highly heated article in a severe chilling bath, checking of the surface and actual breakage of the article is apt to occur unless the severity of chill is so reduced that the resulting degree of temper is far below that which the glass could theoretically stand.

The object of this invention is to preserve the shape and the physical and chemical homogeneity of glass articles while they are being heated preparatory to chilling them.

Another object is to preserve the physical structure of glass articles which during tempering are subjected to extremely severe chilling conditions.

Among its features my invention embodies subjecting a glass article for a period of time sufficient for it to reach substantially equilibrium temperature throughout a temperature which preferably lies between the annealing point and the softening point temperature of the glass from which the article is made, then subjecting the article while in such heated condition to a higher temperature for a limited time, and immediately chilling the article.

For certain purposes I find it desirable to subject the article to a temperature considerably above the softening point temperature of the glass for a very short time. For other purposes I may find it advantageous to apply a temperature somewhat below the softening point temperature for a longer period. Whether I use a high temperature for a short time or a lower temperature for a correspondingly longer time is somewhat optional but in general this is determined by the degree and character of the temper desired, the shape of the article, the condition of its surface, and other factors which must be taken into account due to manufacturing conditions and the equipment used.

In carrying my invention into practice, a glass article, for instance, an airport lighting cover glass 8½ inches in diameter, ranging in thickness from about ⅞ of an inch at its rim to 1¾ inches at the center, and made from a low expansion borosilicate glass of the type described in United States Letters Patent No. 1,304,623, issued to Sullivan and Taylor, May 27, 1919, is heated in a kiln having a temperature of 525 to 550 degrees C. for a period of about thirty minutes or at least long enough for the article to reach substantially equilibrium temperature throughout. At this temperature the glass is sufficiently stiff that warpage of the article does not take place within any reasonable length of time to which the article is subjected to such heating. After reaching a substantially equilibrium temperature of 550 degrees C. throughout, the article is subjected to a temperature of approximately 800 degrees C. where it is allowed to remain for about two minutes, during which time the surface layers of the glass are heated to a temperature appreciably higher than the interior portions so that even if the surface becomes soft enough to flow, the article will not warp or otherwise deform, due to the fact that the interior remains rigid. After so heating, the article is subjected to a chilling medium which, in the present instance, consists of an oil bath having a temperature of approximately 180 degrees C. The method of heating as above described enables me to produce articles having a high degree of temper and also minimizes losses due to sagging and warpage. Moreover, due to the relatively short period of time to which the glass is subjected to the higher temperature, no devitrification can take place such as is commonly experienced when borosilicate glasses of the type referred to are held at temperatures at or near their softening points.

In making other types of ware from a glass of the type above mentioned, I have found it advantageous to make slight modifications in the times and temperatures employed as, for instance, in the manufacture of gage protector glasses commonly referred to in the art as "Klinger" glasses, and which are made in lengths ranging from about 7½ inches to 12⅝ inches, thicknesses of about 1¼ inch and widths about 1¼ inches. Glass articles of this type are initially subjected to a temperature of about 550 degrees C. for a period of about ten minutes or until they have reached a substantially equilibrium temperature of about 550 degrees C. Thereafter they are subjected to a temperature of about 920 degrees to 930 degrees C. for a period of about two to two and one-fourth minutes after which they are chilled in a liquid chilling bath consisting of the eutectic mixture of sodium nitrate and potassium nitrate, held at a temperature of about 250 degrees C.

In the manufacture of articles of still different shapes, for instance, in tempering a three pint casserole made from a borosilicate glass of the type above mentioned, and having a wall thickness of about one-fourth of an inch, I find it advantageous to subject the article to a preheating temperature of about 595 degrees C. for a period of at least ten to twelve minutes and then to place it in a furnace held at a temperature of about 900 degrees C. for one minute and forty-five seconds. Immediately after this heating, it is immersed in a chilling bath consisting of the eutectic mixture of sodium nitrate and potassium nitrate held at a temperature of 285 degrees C. This treatment produces a dish having a maximum tension of about two kilograms per square millimeter and a thermal endurance of at least twice that of a like but annealed article.

The same general procedure is applicable to the manufacture of lime glass articles, as, for instance, in the tempering of a three pint casserole having a wall thickness of about one-eighth of an inch and made from a glass of the following composition:

| | |
|---|---|
| $SiO_2$ | 72.86 |
| $R_2O_3$ | 1.37 |
| $Na_2O$ | 16.29 |
| $K_2O$ | 1.65 |
| $CaO$ | 5.00 |
| $MgO$ | 3.36 |
| $B_2O_3$ | 0.56 |

Such a glass has a strain point temperature of about 485 degrees C., a softening point temperature of about 695 degrees C., and a coefficient of expansion of about 0.00000935. A dish of this kind just described is subjected to a preheating temperature of about 565 degrees C. for about ten to twelve minutes, after which it is subjected to a temperature of about 900 degrees C. for a period of about forty seconds. Immediately thereafter it is immersed in a chilling bath composed of sodium nitrate and potassium nitrate, preferably in the above proportions and held at a temperature of about 400 degrees C. The glass will then have a maximum tension of about two kilograms per square millimeter and a thermal endurance substantially equal to a similar but annealed dish made from a low expansion borosilicate glass.

From the various procedures as above outlined, it becomes obvious that the practice of my invention is applicable to articles which differ widely in size, and shape and which are made from glasses having widely differing physical characteristics. Also, I am not limited to certain types or kinds of chilling media and that with but little experimentation two stage heating as herein described can be used in general tempering practice. While I do not know the exact phenomenon that takes place, actual practice has proven that extremely severe chilling of the glass can be accomplished without breakage or checking during the chilling operation when my method as disclosed above is employed. However, I believe that by using a relatively high temperature for a short time in the second stage heating, the surface of the glass becomes so softened that surface imperfections such as scratches, checks, and the like, will heal with the result that the glass can be given a more severe chill by employing this method than would otherwise be possible.

I claim:

1. The method of tempering a glass article which includes heating the article throughout its thickness to a temperature near the strain point of the glass from which the article is made, rapidly heating the surface of the article in a relatively short interval of time to a temperature well above the strain point of the glass and chilling the article.

2. The method of tempering a glass article which has been weakened by surface imperfections which includes heating the article uniformly throughout its thickness to a temperature above the strain point of the glass from which it is made, rapidly heating the surface of the article to a temperature at which the glass of the surface will soften and flow so as to heal any surface imperfections and chilling the article.

3. The method of tempering a glass article made from a glass having a normally high stability against chemical attack which includes soak heating the article to a temperature near the strain point of the glass from which it is made, rapidly heating the surface of the article to a temperature well above the strain point of the glass and chilling the article.

4. The method of tempering a glass article which is made from a glass which within a predetermined range of temperatures tends to devitrify which includes soak heating the article to a temperature near its strain point but below the temperature at which devitrification will take place and rapidly heating the surface of the article to a temperature above which devitrification will take place and chilling the article.

JESSE T. LITTLETON.